(No Model.)

F. B. SHANNON.
DEVICE FOR TEACHING FRACTIONS.

No. 356,167. Patented Jan. 18, 1887.

Witnesses.
Robt L Fenwick
J. P. Theo. Lang

Inventor:
Fanny B. Shannon
by her attorneys
Mason Fenwick and
Lawrence (No Model.) 2 Sheets—Sheet 2.
F. B. SHANNON.
DEVICE FOR TEACHING FRACTIONS.
No. 356,167. Patented Jan. 18, 1887.
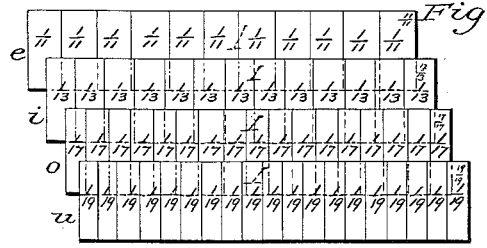
Fig. 4.
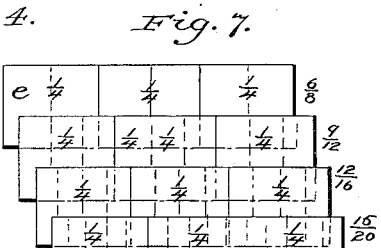
Fig. 7.
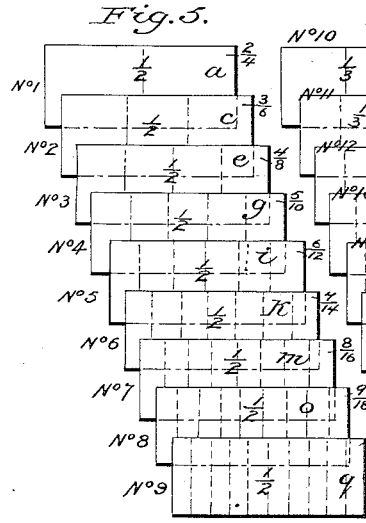
Fig. 5. Fig. 6.
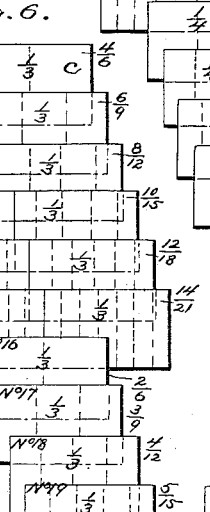
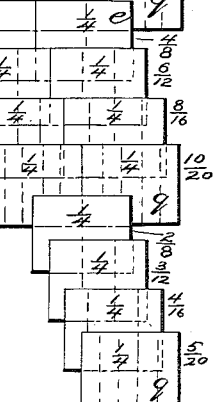
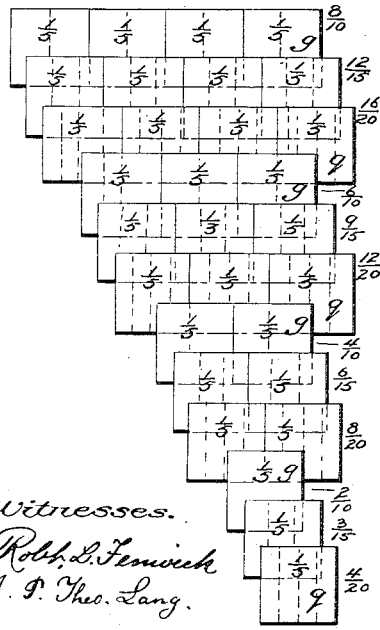
Fig. 8.
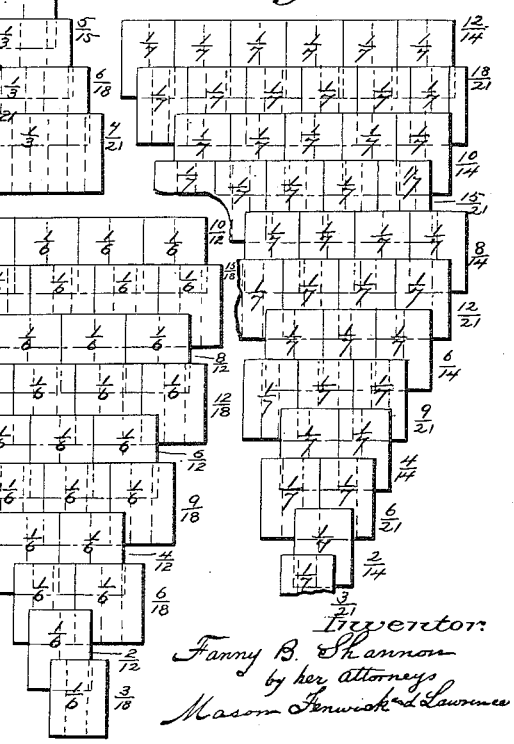
Fig. 9. Fig. 10.
Witnesses.
Robt. L. Fenwick
J. P. Theo. Lang.
Inventor:
Fanny B. Shannon
by her attorneys
Mason, Fenwick & Lawrence

UNITED STATES PATENT OFFICE.

FANNY B. SHANNON, OF DENVER, COLORADO.

DEVICE FOR TEACHING FRACTIONS.

SPECIFICATION forming part of Letters Patent No. 356,167, dated January 18, 1887.

Application filed December 24, 1883. Serial No. 115,426. (No model.)

*To all whom it may concern:*

Be it known that I, FANNY B. SHANNON, a citizen of the United States, residing at Denver, in the county of Arapahoe and State of Colorado, have invented certain new and useful Blocks or Cards for Use in Teaching Fractions to the Child Mind, of which the following, together with the drawings, is a specification sufficient to enable others to understand, make, and use the same.

My invention consists of certain novel blocks or cards prepared for use in series, sets, or packs, or in a combination of series, sets, or packs, as will be hereinafter described; and its object is to present to the child mind by means of blocks or cards the relative value of fractional parts of units to an integral standard unit of measurement, accomplishing this by combining with such integral unit a series of fractional units which, when used together according to their sizes and adaptability, will form integral units corresponding with the standard unit of measurement, thus facilitating the work of teaching the difference between whole and fractional numbers, and at the same time enabling pupils to readily comprehend the relative sizes of fractional parts, how in value they compare with one another and with the integral standard unit of measurement, and familiarizing the child mind with difference in color. These objects I attain by the device of blocks or cards illustrated in the accompanying drawings, in which—

Figure 1 represents a series or set of blocks or cards made in accordance with my invention, and a case or box in which they may be kept for use. In this view some of the blocks or cards are shown with surface or line shading for the purpose of indicating that the blocks or cards are of different colors—that is, those of one row are different in color from those of another row. Fig. 2 is a diagram representing one of the respective blocks or cards of the different rows of fractional unit blocks or cards used in making a series of integral unit blocks or cards, such as are represented in Figs. 1 and 3. Fig. 3 represents a set of integral unit blocks or cards of equal length, having the unit number 1 on one face of each, and demarkation-lines forming spaces of equal width, respectively, and fractional numbers—as $\frac{1}{2}$, $\frac{1}{3}$, to $\frac{1}{12}$—expressed on their other faces successively. Fig. 4 is a representation of four cards or blocks marked with division-lines and prime fractional numbers. Figs. 5, 6, 7, 8, 9, and 10 are cards or blocks having (in some instances) division or demarkation lines and fractional units on their front and rear surfaces, and in other instances these demarkations and fractional numbers represented on one side and only the fractional number on the other.

In the drawings the same letters are used to designate like parts in the several views.

$A^2$ in the drawings designates a box or case of any suitable size and construction, preferably formed of two parts hinged together at $a$, and forming a suitable receptacle for the improved blocks or cards used in giving instruction in fractions.

My educational blocks or cards may comprise an undivided or integral unit block or card, A, of any given size or form, and a series of rows of blocks or cards—as M, N, O, P, Q, R, S, T, U, V, W—or a greater or less number of rows of such fractional unit blocks or cards, which represent fractions of other integral unit blocks or cards corresponding with the integral unit block or card A, any given number of which fractional unit blocks or cards, according to their relative sizes and adaptability for use with one another, will form, when placed together, as shown, integral unit blocks or cards equal in size to the said integral block or card A. The integral unit block or card A constitutes a base of measurement or is a standard of size or value, and may be of a certain color to distinguish it from the other blocks or cards, and have the figure 1 expressed on one or more of its surfaces.

The two fractional unit blocks or cards M, which are together equal in length and breadth to that of the unit block or card A, and, respectively, one-half its length, represent halves, and may be of a different color from the unit-block A and have $\frac{1}{2}$ expressed on each of them. These fractional blocks or cards placed together end to end equal in proportion and value the unit block or card A.

The three fractional unit blocks or cards N together equal in length and breadth the unit-block A, and, being each one-third the length of the same, represent thirds. They should be of a different color from the blocks or cards A and M, and have ½ expressed upon each of them, and the same, when placed end to end, equal in proportion and value the unit block or card A. The four fractional unit blocks or cards O, as well as all the other succeeding rows of fractional blocks or cards, are prepared, respectively, with proper fractional numbers expressed upon them—as $\frac{1}{4}, \frac{1}{5}, \frac{1}{6}, \frac{1}{7}, \frac{1}{8}, \frac{1}{9}, \frac{1}{10}, \frac{1}{11}, \frac{1}{12}$—and of different colors, so as to form, respectively, when placed end to end, as illustrated in the drawings, integral units equal in proportion and value to the unit-block A, each row, when formed, being of a different color.

In Fig. 1 twelve rows of blocks or cards are shown, the first row being formed of a single block or card, A, and the others of fractional unit blocks or cards—as halves, thirds, fourths, fifths, sixths, sevenths, eighths, ninths, tenths, elevenths, and twelfths—and each row of these is of a different color, and the fractional marks mentioned above are expressed upon the fractional parts forming the same in the manner shown. With this series of blocks or cards the pupil can be taught that the block or card A is a unit or whole number, while the two fractional unit-blocks M are equal parts of that unit, and together are equal to it in length and breadth; and as each fractional block or card M is one-half the unit block or card A it represents a half, while the two fractional blocks or cards M, when placed together end to end, being equal to said unit card or block A, represent halves, which together are equal to said unit card or block.

The same mode of teaching with the block or card M is followed with respect to the other rows designated by letters N, O, P, Q, R, S, T, U, V, W, and marked with figures expressing fractions, and of different colors.

The child mind can be forcibly and rapidly taught that the respective rows of integral units from N to W, formed of fractional units, are but equivalents of block A. The entire number of blocks or cards in the illustration given is seventy-seven fractional and one integral unit, or twelve integral units, eleven of which being formed of the seventy-seven fractional units.

The different denominations of the fractional blocks or cards and the unit may be distinguished from each other by the difference in their sizes, by the figures expressed thereon, and by having the integral unit card or block of one color, the halves a different color, and the thirds to the twelfths each a different color. I prefer to employ only fractional unit divisions of the integral.

By the blocks or cards the pupils will become simultaneously familiar with different colors and different values and sizes of fractional units relatively to a unit, and with the different relative values of the units themselves, and the numbers used to represent the respective fractional units and the sizes or values of the fractional parts.

The unit blocks or cards A and the fractional unit blocks or cards M, N, O, P, Q, R, S, T, U, V, W, described, may be constructed of wood, pasteboard, &c., and if made in the form of cards the integral unit-card will be similar in length and width to the unit-block A in Fig. 1, and upon the card-board of which the cards are constructed will be placed the same numbers and colors as are placed upon the blocks. The integral unit-card and the fractional unit-cards would be used by the teacher and pupil in the same manner as said blocks, and the same benefits secured.

In Fig. 3 twelve integral unit cards or blocks, A, B, C, D, E, F, G, H, I, J, K, L, are shown as an equivalent mode of constructing and carrying out my invention. Card A has the number and value 1 expressed on its front and rear sides, while the other eleven cards should have the number and value 1 expressed on one of their face sides, while on their plain sides division or demarkation lines running up and down should be described, the same dividing, respectively, the cards into equal spaces, as shown in the drawings. These demarkations divide the face of card B into two equal spaces, and each space should have the value thereof ($\frac{1}{2}$) expressed thereon. The sum of ½ and ½, which is $\frac{2}{2}$, should be expressed on one corner of the face of the card B. In like manner the different cards succeeding card B are prepared, each having its proper number of demarkations and spaces and proper fractional numbers expressed upon it, as illustrated in the drawings, wherein it is shown that accordingly as the fractional units decrease in value the number of demarkations, size of the spaces, and the numbers are changed. The same twelve colors are here used as with the blocks or cards shown in Figs. 1 and 2.

In Fig. 4 four integral unit-cards, with the number 1 (one) expressed on one surface, and demarkations forming spaces which have appropriate fractional values expressed thereon, are illustrated. The four cards are all of one color, and may show the sum of the prime fractional numbers expressed in one corner of the cards. They will give the prime numbers under 21, to which the invention is preferably extended. They are made of one color, and, preferably, of such as is not used upon any other card or block.

In Fig. 5 nine cards are shown with fractional numbers (½) on one of their sides, expressing their value, instead of a whole number, as the unit 1. The cards from 1 to 9, inclusive, have demarkations described up and down on the other sides, as is shown by dotted lines in the drawings, causing them to represent, respectively, fourths, sixths, eighths, tenths, twelfths, fourteenths, sixteenths, eighteenths, and twentieths.

On card No. 1 of Fig. 5 the value ½ is expressed upon one of its faces, the rear face is divided by demarkation so as to represent two equal parts, each of which is the same in length and breadth to one-fourth of the integral unit-card A, and the value $\frac{1}{4}$ is expressed in each. The sum of these two values ($\frac{1}{4}$ and $\frac{1}{4}$) may be expressed in one corner of the rear face. On card No. 2 of Fig. 5 the value $\frac{1}{2}$ is expressed upon one of its faces. The rear face is divided by demarkations so as to represent three equal parts, one of which is the same in length and breadth to one-sixth ($\frac{1}{6}$) of the integral unit-card A, and the value $\frac{1}{6}$ is expressed in each. The sum of these three values ($\frac{1}{6}, \frac{1}{6}, \frac{1}{6}$) may be expressed on one corner of the rear face.

The same explanation applies to cards 3, 4, 5, 6, 7, 8, 9, only the demarkations describe spaces of other values, and other but appropriate fractional numbers are expressed therein, and the sums of these values, respectively, are expressed upon the rear faces of these cards successively. The cards of Fig. 6 are twelve in number, and have demarkations upon both the front and rear surfaces of the first six, as represented in the drawings. The front surfaces are divided into two equal spaces by the demarkation up and down, each of which equals one-third of the integral unit-card A in length and breadth. The value of each space $\frac{1}{3}$ should be expressed therein. The front surface of card No. 10 of Fig. 6 illustrates two-thirds; but its rear surface, by demarkations up and down, represents sixths in spaces, whose values ($\frac{1}{6}$) should be expressed thereon. The sum of these fractional unit values ($\frac{1}{6}, \frac{1}{6}, \frac{1}{6}, \frac{1}{6}$) which is four-sixths, ($\frac{4}{6}$,) may be expressed in one corner of this rear surface.

The front surface of No. 11 of Fig. 6 illustrates two-thirds; but its rear surface, by demarkations up and down, represents ninths in spaces, whose values ($\frac{1}{9}$) should be expressed therein. The sum of these fractional unit values, ($\frac{1}{9}, \frac{1}{9}, \frac{1}{9}, \frac{1}{9}, \frac{1}{9}, \frac{1}{9}$,) which is six-ninths, may be expressed in one corner of this rear surface.

Card 12 of Fig. 6 illustrates two-thirds upon its front surface and twelfths upon its rear surface. Card 13, Fig. 6, represents two-thirds; upon its front surface and fifteenths upon its rear surface, &c.; but cards Nos. 16, 17, 18, 19, 20, 21 have no demarkations on their front surfaces, consequently have only one value expressed thereon, ($\frac{1}{3}$,) and but half the number of spaces, respectively, are upon their rear surfaces as are, respectively, upon the cards 10, 11, 12, 13, 14, 15 of this series, Fig. 6. Card 16 has its value ($\frac{1}{3}$) expressed upon its front surface; but its rear surface, by a demarkation up and down, is divided into two spaces, which equal in length and breadth one-sixth of the unit-card A. The value of each space ($\frac{1}{6}$) should be expressed therein. The sum of these values, ($\frac{1}{6}, \frac{1}{6}$,) which is $\frac{2}{6}$, may be written on one corner of the rear surface. Card 17 represents thirds on its front surface, expressed by the fractional number $\frac{1}{3}$, and three-ninths upon its rear surface, indicated and expressed by demarkations and fractional numbers $\frac{1}{9}, \frac{1}{9}, \frac{1}{9}$, and the sum of the values of the spaces is expressed in one corner of the rear surface. Cards 18, 19, 20, 21 of Fig. 6 can be explained in the same manner.

Figs. 7, 8, 9, 10 only differ with Fig. 6 in being an extension of the invention, and will be readily understood by an examination of the drawings.

I prefer Figs. 5, 6, 7, 8, 9, 10 all of different colors or shades upon their surfaces, but prefer the rear surfaces of one color and of a color nowhere else employed in the construction of the cards, because this one or common color will aid in the illustration of the common denominator, as well as the reduction of numbers to higher and lower denominators. Letters $a$, $b$, $c$, and so on, may be expressed upon the cards that are divided into corresponding spaces on the rear side—as, for instance, if the card which has $\frac{2}{4}^{n}$ expressed on its front surface, card $\frac{1}{5}^{n}$, and card $\frac{1}{2}^{n}$ be collected, it will be found they each represent twentieths on the reverse side, which is one of their common denominators. Consequently these letters aid in handling the cards.

By the blocks or cards described the pupil will become simultaneously familiar with different colors, different values and sizes of fractional numbers as they relate to units and to themselves, and the different numbers used to represent the fractional parts. The blocks or cards will illustrate whole numbers, fractional numbers, mixed numbers, compound fractions, proper and improper fractions with different denominators, fractions of common denominators, and so on.

By different divisions of the unit or integral card or block other dimensions may be produced; but I prefer to extend no further than described, and prefer to employ fractional units and the sums of the same expressed in the corners of any block or card which will aid in comprehending and computing the values.

The integral and fractional blocks or cards may be manufactured from any suitable material—such as wood, paper, oil-cloth, linoleum—and may have the figures, letters, or numbers used to designate them and express their values applied to them by printing, painting, stamping, engraving, or by other modes found most convenient.

What I claim is—

1. The within-described new article of manufacture, to wit: a set or series of blocks or cards for teaching fractions, divided into fractional parts and colored so that the colors are applied distinctively to the values or measurements expressed by the divisions of the blocks or cards, substantially as set forth.

2. The within-described means for illustrating and teaching fractions, as a new article of manufacture, to wit: a set or series of blocks or cards for teaching fractions, divided into fractional parts and colored so that the colors are applied distinctively to the values or measurements expressed by the divisions of the blocks or cards, with a card or block constituting the standard of value or measurement, substantially as set forth.

3. The within-described new article of manufacture, to wit: a set or series of blocks or cards for teaching fractions, divided into fractional parts and colored so that the colors are applied distinctively to the values or measurements expressed by the division of the blocks or cards and marked with the letters of the alphabet, substantially as set forth.

4. The within-described new article of manufacture, to wit: a set or series of blocks or cards for teaching fractions, divided into fractional parts and colored so that the colors are applied distinctively to the values or measurements expressed by the divisions of the blocks or cards and marked with the letters of the alphabet, with a block or card constituting the standard of value or measurement, substantially as set forth.

5. The within-described new article of manufacture, to wit: a set or series of blocks or cards for teaching fractions and colored so that the colors are applied distinctively to the values or measurements expressed by the divisions of the blocks or cards, and marked with the simple values or measurements of the fractional parts expressed, or with the sums of these values or measurements, or with both, substantially as set forth.

6. The within-described new article of manufacture, to wit: a set or series of blocks or cards for teaching fractions and colored so that the colors are applied distinctively to the values or measurements expressed by the divisions of the blocks or cards, and marked with the simple values or measurements of the fractional parts expressed by the divisions, or with the sums of these values or measurements, or with both, with a block or card constituting the standard of measurement, substantially as set forth.

7. The within new article of manufacture, to wit: a set or series of blocks or cards for teaching fractions, divided into fractional parts and colored so that the colors are applied distinctively to the values or measurements expressed by the divisions of the blocks or cards, and marked with the simple values or measurements expressed, or with the sum of these values or measurements, or with both, and also marked with the letters of the alphabet, substantially as set forth.

8. The within-described new article of manufacture, to wit: a set or series of blocks or cards for teaching fractions, divided into fractional parts and colored so that the colors are applied distinctively to the values or measurements expressed by the divisions of the blocks or cards, and marked with simple values or measurements expressed, or with the sums of these values or measurements, or with both, and marked with the letters of the alphabet, with a card or block constituting the standard of value or measurement, substantially as set forth.

9. The within-described new article of manufacture, to wit: a set or series of blocks or cards for teaching fractions, divided into fractional parts and colored so upon the faces that the colors are applied distinctively to the values or measurements expressed by the divisions of the blocks or cards, (but of a different coloring on the reverse sides,) substantially as set forth.

10. The within-described new article of manufacture, to wit: a set or series of blocks or cards for teaching fractions, divided into fractional parts and colored so upon the faces that the colors are applied distinctively to the values or measurements expressed by the divisions of the blocks or cards, (but of a different coloring on the reverse sides,) with a block or card constituting the standard of value or measurement, substantially as set forth.

11. The within-described new article of manufacture, to wit: a set or series of blocks or cards for teaching fractions, divided into fractional parts and colored so that the colors upon the faces are applied distinctively to the values or measurements expressed by the divisions of the blocks or cards, (but of a different coloring on the reverse sides,) marked with letters of the alphabet, substantially as set forth.

12. The within-described new article of manufacture, to wit: a set or series of blocks or cards for teaching fractions, divided into fractional parts and colored so that upon the faces the colors are applied distinctively to the values or measurements expressed by the divisions of the blocks or cards, (but of a different coloring on the reverse sides,) and marked with the letters of the alphabet, with a block or card constituting the standard of measurement or value, substantially as set forth.

13. The within-described new article of manufacture, to wit: a set or series of blocks or cards for teaching fractions, divided into fractional parts and colored so that the colors upon the faces are applied distinctively to the values or measurements expressed by the divisions of the blocks or cards, (but of a different coloring upon the reverse sides,) and marked with the simple values or measurements expressed, or the sums of these values or measurements, (or the simple values or measurements and the sums,) substantially as set forth.

14. The within-described new article of manufacture, to wit: a set or series of blocks or cards for teaching fractions, divided into fractional parts and colored so that the colors upon the faces are applied distinctively to the values or measurements expressed by the divisions of the blocks or cards, (but of a different coloring upon the reverse sides,) and marked with the simple values or measurements expressed, or the sums of these values or measurements, (or with the simple values or measurements and the sums,) with a block or card constituting the standard of value or measurement, substantially as set forth.

15. The within-described new article of manufacture, to wit: a set or series of blocks or cards for teaching fractions, divided into fractional parts and colored so that the colors upon the faces are applied distinctively to the values or measurements expressed by the divisions of the blocks or cards, (but of a different coloring upon the reverse sides,) and marked with the simple values or measurements expressed, or the sums of these values or measurements, (or the simple values or measurements and the sums,) and marked with the letters of the alphabet, substantially as set forth.

16. The within-described article of manufacture, to wit: a set or series of blocks or cards for teaching fractions, divided into fractional parts and colored so that the colors upon the faces are applied to the values or measurements expressed by the divisions of the blocks or cards, (but of a different coloring on the reverse sides,) and marked with the simple values or measurements expressed, or the sums of these values or measurements, (or with the simple measurements or values and the sums,) and marked with the letters of the alphabet, with a block or card constituting the standard of value or measurement, substantially as set forth.

In testimony whereof I affix my signature in presence of two witnesses.

FANNY B. SHANNON.

Witnesses:
SIMON COHEN,
E. A. SHANNON.